United States Patent Office 2,945,059
Patented July 12, 1960

2,945,059

MEVALONIC ACID

Clifford H. Shunk, Westfield, and Karl Folkers, Plainfield, N.J., assignors to Merck & Co., Inc., Rahway, N.J., a corporation of New Jersey No Drawing. Filed Mar. 31, 1958, Ser. No. 724,830

2 Claims. (Cl. 260—535)

This invention relates to mevalonic acid and particularly to a process for resolving the two isomeric forms in which it exists. Mevalonic acid has the structure:

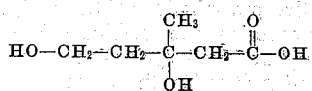

and its lactone has the structure:

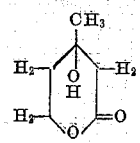

Mevalonic acid, as well as its lactone, is known to have important nutrient value and it has been shown that one isomer possesses superior nutritional value over the other isomer. We have arbitrarily designated the active one as the α-isomer, and the inactive one as the β-isomer. In the chemical manufacture of mevalonic acid both the α- and the β-isomers are formed simultaneously. Consequently, it is desirable to carry out a resolution which will separate the two isomers and enable the recovery of the active α-isomer, and this is accomplished by the present invention.

The synthesis of αβ-mevalonic acid may be carried out by several known processes. Representative processes are set forth in the following articles:

D. E. Wolf, C. H. Hoffman, P. E. Aldrich, H. R. Skeggs, L. D. Wright and K. Folkers, J. Amer. Chem. Soc., 78, 4499 (1956).

D. E. Wolf, C. H. Hoffman, P. E. Aldrich, H. R. Skeggs, L. D. Wright and K. Folkers, ibid., 79, 1486 (1957).

C. H. Hoffman, A. F. Wagner, A. N. Wilson, E. Walton, C. H. Shunk, D. E. Wolf, F. W. Holly and K. Folkers, ibid., 79, 2316 (1957).

In accordance with the present invention the mixture of the lactones of α- and β-mevalonic acid, which is produced by the chemical reactions of the above publications, is combined with (+)-α-phenyl-1-naphthalenemethylamine in the presence of a solvent for the two reactants. The solvent preferably is one which can be removed readily by vacuum distillation such as absolute ethanol or methanol or propanol.

A slight molecular excess of the amine over the lactones is desirable but not essential. The reaction should be carried out at an elevated temperature and preferably at a refluxing temperature. The reaction produces the (+)-α-phenyl-1-naphthalenemethylamide of the α-isomer and also of the β-isomer of the lactone.

This mixture of the two amides is recovered by vacuum distillation of the solvent and the mixture is then added to a solvent such as benzene from which the α- and β-isomers will fractionally crystallize. The higher melting product is recovered as it contains the desired α-isomer of mevalonic acid. Alkaline hydrolysis of this (+)-α-phenyl-1-naphthalene-methylamide of α-mevalonic acid yields the active α-mevalonic acid. If it is desired to obtain this product in a more purified form it is combined with N,N'-dibenzylethylene diamine and the resulting DBED salt of α-mevalonic acid is allowed to crystallize out of a solvent.

The DBED moiety of this salt is removed by resin exchange or by neutralization with an alkali followed by extraction of the DBED. Then, by neutralization of the aqueous solution with an acid it is possible to obtain the purified α-mevalonic acid. The α-mevalonic acid thus obtained has twice the microbiological activity of the same weight of αβ-mevalonic acid when tested according to the procedure of H. R. Skeggs et al., J. Bact. 72, 519, (1956).

As an alternative procedure the mixture of the (+)-α-phenyl-1-naphthalenemethylamides of the α- and β-mevalonic acid may be esterified by combining it with acetic anhydride in the presence of a solvent such as pyridine. The resulting O-acetyl derivatives are recovered by vacuum distillation of the solvent. These derivatives are added to a solvent from which the α- and β-isomers will fractionally crystallize. A suitable solvent is benzene to which petroleum ether has been added.

The α-isomer of the amide ester of the O-acetyl mevalonic acid is recovered, and the amide and ester components are removed by alkaline hydrolysis to yield α-mevalonicacid. This may be purified by conversion to the DBED salt as outlined above.

The following examples further illustrate the invention:

EXAMPLE I (Step A) (+)-α-Phenyl-1-naphthalenemethylamide of α-mevalonic acid To 8.0 g. of (+)-α-phenyl-1-naphthalenemethylamine was added 4.0 g. of αβ-mevalonic acid lactone and 10 ml. of absolute ethanol. The solution was refluxed for 17 hours. Most of the ethanol was removed by evaporation under reduced pressure. The residual oil was dissolved in chloroform and extracted with three 35 ml. portions of ice-cold 1 N hydrochloric acid to remove the residual starting amine. The chloroform solution was washed with three portions of water, dried over magnesium sulfate, filtered and concentrated, leaving 9.50 g. of a viscous oil. This oil is a mixture of the amides of the α-mevalonic acid and the β-mevalonic acid.

This oil was dissolved in 60 ml. of benzene and kept at room temperature overnight. The solid that separated was the amide of the α-mevalonic acid and it was collected, washed with benzene, and dried under reduced pressure, wt. 6.30 g., M.P. 113–120°, $(\alpha)_D^{25}+23°$ (C. 1.2 in chloroform). This crop was recrystallized from benzene six times yielding the desired product (+)-α-phenyl-1-naphthalenemethylamide of α-mevalonic acid, melting at 151–152°, $(\alpha)_D^{26}+29°$ (C. 1.1 in form).

Analysis.—Calc'd. for $C_{23}H_{25}NO_3$: C, 76.00, H, 6.93; N, 3.85. Found: C, 76.28; H, 6.90; N, 3.81.

(Step B) α-Mevalonic acid

The (+)-α-phenyl-1-naphthalenemethylamide of mevalonic acid (0.43 g.), melting at 151–152°, was dissolved in 12 ml. of ethanol and 12 ml. of 1.0 N sodium hydroxide was added. The mixture was heated in a steel bomb at 150° for three hours. The resulting solution was diluted with water, evaporated to remove the ethanol and the resulting aqueous solution was extracted with chloroform. The aqueous solution was acidified with hydrochloric acid and lyophilized. The resulting material was extracted with several portions of hot chloroform. Evaporation of the chloroform extract left 0.07 g. of an oil which contained the α-mevalonic acid in relatively pure form.

(Step C) *N,N'-dibenzylethylenediamine salt of α-mevalonic acid*

The product of Step B was dissolved in 5 ml. of water and 0.07 g. of N,N'-dibenzylethylenediamine in 10 ml. of ethanol was added. The solution was kept at room temperature overnight and then evaporated under reduced pressure to remove the ethanol. The aqueous solution was extracted with 3 x 1 ml. of chloroform. The combined chloroform extracts were reextracted with 2 x 1 ml. of water. The aqueous extracts were combined with the first water solution. This was concentrated under reduced pressure, giving 0.10 g. of an oil which was dissolved in 2 ml. of methanol. Ether (10 ml.) was added and the precipitate that separated was collected and washed with ether, M.P. 122–124°, wt. 58 mg. Recrystallization from methanol-ether raised the melting point to 125–126°.

*Analysis.*—Calc'd. for $C_{28}H_{44}N_2O_8$: C, 62.66; H, 8.26. Found: C, 62.60; H, 8.28.

(Step D) *Regeneration of α-mevalonic acid from the DBED salt*

The α-mevalonic acid was obtained from the α-mevalonic acid DBED salt by passing an aqueous solution of the salt over an IRC–50 ion exchange resin on the acid cycle. Removal, as by vacuum distillation, of the water of the eluate gives α-mevalonic acid.

EXAMPLE II

*(+)-α-Phenyl-1-naphthalenemethylamide of O-acetyl-α-mevalonic acid*

The O-acetyl derivative of the amide obtained in Step A was prepared by reaction of 99 mg. of it with 0.60 ml. of acetic anhydride in 1 ml. of pyridine for 20 hours at 25°. The solution was evaporated under reduced pressure leaving 117 mg. of a viscous oil. This was dissolved in 4 ml. of benzene and petroleum ether (B.P. 30–60°) was added to incipient cloudiness. The crystals that separated were collected, wt. 101 mg., M.P. 141–147°. The material was recrystallized from benzene and then from methanol, M.P. 147–148°.

*Analysis.*—Calc'd. for $C_{25}H_{27}NO_4$: C, 74.05; H, 6.71; N, 3.45. Found: C, 74.33; H, 6.60; N, 3.61.

Hydrolysis of the O-acetyl derivative of the (+)-α-phenyl-1-naphthalenemethylamide of α-mevalonic acid, melting at 147–148° by the method described in Step B of Example I also gave α-mevalonic acid with twice the microbiological activity of the synthetic αβ-compound. This α-mevalonic acid can be purified by carrying out the Steps C and D of Example I.

What is claimed is:

1. The method of recovering α-mevalonic acid from αβ-mevalonic acid which includes the steps of mixing in the presence of a solvent (+)-α-phenyl-1-naphthalenemethylamine with the αβ-mevalonic acid lactone at elevated temperatures, removing said solvent and recovering the resulting mixture of the (+)-α-phenyl-1-naphthalenemethylamides of the α- and the β-mevalonic acids, adding said mixture of amides to benzene to thereby obtain a selective precipitation of the amide of α-mevalonic acid, recovering the precipitated amide of the α-mevalonic acid and hydrolyzing it to remove the amide component, and recovering the α-mevalonic acid.

2. The process according to claim 1 in which the recovered α-mevalonic acid is further purified by mixing it with N,N'-dibenzylethylenediamine to obtain the salt, allowing the salt to crystallize from a solvent, and removing the dibenzylethylenediamine moiety to obtain purified α-mevalonic acid.

References Cited in the file of this patent
UNITED STATES PATENTS

| | | |
|---|---|---|
| 2,334,524 | Wenker | Nov. 16, 1943 |
| 2,539,472 | Ratchford et al. | Jan. 30, 1951 |
| 2,829,160 | Stehman et al. | Apr. 1, 1958 |

OTHER REFERENCES

Gilman: Organic Chemistry, vol. 1, p. 188–9 (1938).
Wolf et al.: J.A.C.S., vol. 79, p. 1486–7 (1957).